(12) United States Patent
Baudu et al.

(10) Patent No.: US 8,931,253 B2
(45) Date of Patent: *Jan. 13, 2015

(54) DOUBLE-ACTING TELESCOPIC LINEAR ACTUATOR WITH SINGLE-MOTOR DRIVE SYSTEM

(75) Inventors: Pierre Andre Marcel Baudu, Criquetot l'Esneval (FR); Guy Bernard Vauchel, Le Havre (FR)

(73) Assignee: Aircelle, Gonfreville l'Orcher (FR)

( * ) Notice: Subject to any disclaimer, the term of this patent is extended or adjusted under 35 U.S.C. 154(b) by 959 days.

This patent is subject to a terminal disclaimer.

(21) Appl. No.: 12/681,416

(22) PCT Filed: Aug. 20, 2008

(86) PCT No.: PCT/FR2008/001201
§ 371 (c)(1),
(2), (4) Date: Apr. 2, 2010

(87) PCT Pub. No.: WO2009/056713
PCT Pub. Date: May 7, 2009

(65) Prior Publication Data
US 2010/0205931 A1 Aug. 19, 2010

(30) Foreign Application Priority Data
Oct. 4, 2007 (FR) ...................... 07 06964

(51) Int. Cl.
*F02K 1/72* (2006.01)
*F02K 1/76* (2006.01)
*H02K 7/06* (2006.01)

(52) U.S. Cl.
CPC . *F02K 1/763* (2013.01); *F02K 1/72* (2013.01); *H02K 7/06* (2013.01)
USPC ......... 60/226.2; 60/771; 74/89.35; 244/110 B

(58) Field of Classification Search
USPC .................. 60/226.2, 226.3, 771; 244/110 B; 74/89.35, 89.26
See application file for complete search history.

(56) References Cited

U.S. PATENT DOCUMENTS 3,829,020 A * 8/1974 Stearns ..................... 239/265.13
4,521,707 A * 6/1985 Baker ............................. 310/80
(Continued)

FOREIGN PATENT DOCUMENTS

| FR | 2895482 | 6/2007 |
| FR | 2902839 | 12/2007 |
| WO | 2007/099333 | 9/2007 |

OTHER PUBLICATIONS

"Crash rumours focused on 'thrust reversers'", BBC News, published Nov. 3, 1999 (accessed on Oct. 25, 2013 at http://news.bbc.co.uk/2/hi/science/nature/503780.stm).*

(Continued)

*Primary Examiner* — Ehud Gartenberg
*Assistant Examiner* — Lorne Meade
(74) *Attorney, Agent, or Firm* — Brinks Gilson & Lione

(57) ABSTRACT

A thrust reverser for a turbojet engine includes a telescopic linear actuator for a moving cowl and a nozzle-forming end part. The telescopic linear actuator has a base attached to a fixed frame, acting as a housing for a first rod prevented from rotating but able to be translationally driven by a first drive shaft connected to a rotational-driver. The first rod is attached by one end to the moving cowl and supports a second rod, which is attached by one end to the nozzle-forming end part that is to be moved. The second rod is prevented from rotating and translationally driven by a second drive shaft passing through the base and connected to a rotational-driver. In particular, the rotational-driver of the rods includes a motor to drive an input shaft of a differential having two output shafts.

2 Claims, 4 Drawing Sheets

(56) References Cited

U.S. PATENT DOCUMENTS

| | | | |
|---|---|---|---|
| 5,144,851 A * | 9/1992 | Grimm et al. | 74/89.26 |
| 5,313,852 A * | 5/1994 | Arena | 74/89.35 |
| 5,778,659 A | 7/1998 | Duesler et al. | |
| 5,806,302 A | 9/1998 | Cariola et al. | |
| 5,960,626 A * | 10/1999 | Baudu et al. | 60/226.2 |
| 6,094,908 A * | 8/2000 | Baudu et al. | 60/226.2 |
| 6,584,763 B2 * | 7/2003 | Lymons et al. | 60/226.2 |
| 6,684,623 B2 * | 2/2004 | Langston et al. | 60/226.2 |
| 6,772,653 B1 * | 8/2004 | Franksson | 74/89.36 |
| 7,802,488 B2 * | 9/2010 | Bucheton et al. | 74/89.23 |
| 7,883,054 B2 * | 2/2011 | Elliott et al. | 244/99.9 |
| 2006/0266146 A1 * | 11/2006 | Waide | 74/424.92 |
| 2007/0144846 A1 * | 6/2007 | Bucheton et al. | 188/297 |
| 2009/0188233 A1 * | 7/2009 | Vauchel et al. | 60/226.2 |
| 2010/0089029 A1 * | 4/2010 | Somerfield et al. | 60/226.2 |
| 2010/0192715 A1 * | 8/2010 | Vauchel et al. | 74/89.35 |
| 2010/0205931 A1 * | 8/2010 | Baudu et al. | 60/226.2 |
| 2010/0218479 A1 * | 9/2010 | Moradell-Casellas et al. | 60/226.2 |
| 2010/0229528 A1 * | 9/2010 | Ramlaoui et al. | 74/89.23 |
| 2012/0067975 A1 * | 3/2012 | Vauchel | 239/265.33 |

OTHER PUBLICATIONS

International Search Report; PCT/FR2008/001201; Dec. 30, 2009.

* cited by examiner

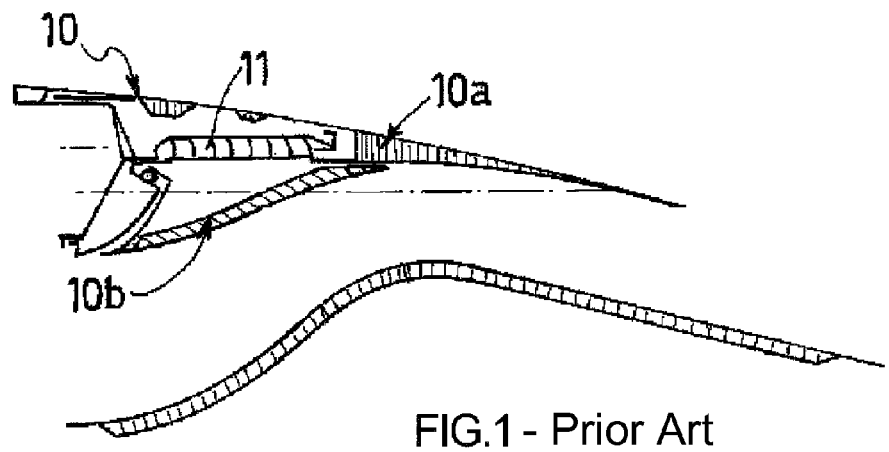
FIG.1 - Prior Art
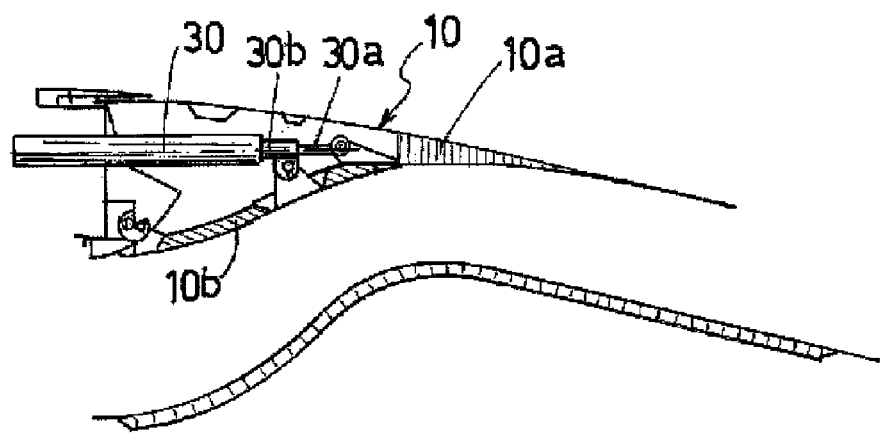
FIG.2 - Prior Art

DOUBLE-ACTING TELESCOPIC LINEAR ACTUATOR WITH SINGLE-MOTOR DRIVE SYSTEM

TECHNICAL FIELD

The present invention relates to a drive system for a double-acting telescopic linear actuator intended to allow a first element and a second element to be moved with respect to a fixed element, these three elements belonging, in particular, to a thrust reverser for a turbojet engine nacelle.

BACKGROUND

An airplane is propelled by a number of turbojet engines each housed in a nacelle that also houses the collection of auxiliary actuating devices associated with its operation and performing various functions when the turbojet engine is operating or not operating. These auxiliary actuating devices comprise, in particular, a mechanical system for actuating thrust reversers.

A nacelle generally has a tubular structure comprising an air intake upstream of the turbojet engine, a central section intended to surround a fan of the turbojet engine, a downstream section housing thrust-reversal means and intended to surround the combustion chamber of the turbojet engine, and generally ends in a jet pipe nozzle, the outlet of which is situated downstream of the turbojet engine.

Modern nacelles are intended to house a bypass turbojet engine able, using the blades of the rotating fan, to generate a flow of hot air (also known as the primary flow) coming from the combustion chamber of the turbojet engine, and a flow of cold air (the bypass or secondary flow), which flows around the outside of the turbojet engine through an annular passage also known as a flow path, formed between a cowling of the turbojet engine and an internal wall of the nacelle. The two air flows are ejected from the turbojet engine via the rear of the nacelle.

The purpose of a thrust reverser is, when an airplane is coming in to land, to improve the ability of the airplane to brake by redirecting forward at least some of the thrust generated by the turbojet engine. During this phase, the reverser obstructs the flow path for the cold flow and directs the latter toward the front of the nacelle, thereby generating a reverse thrust which adds to the braking of the wheels of the airplane.

The means used to perform this redirection of the cold flow vary according to the type of reverser. However, in all cases, the structure of a reverser comprising moving cowls that can be moved between, on the one hand, a deployed position in which they open up within the nacelle a passage intended for the diverted flow and, on the other hand, a retracted position in which they close off this passage. These cowls may perform a deflecting function or may simply have deflection means.

In the case of a cascade-type thrust reverser, the air flow is redirected by cascades of deflection vanes, the cowl having a simple function merely of sliding aimed at uncovering or covering these cascades of vanes, the translational movement of the moving cowl being along a longitudinal axis substantially parallel to the axis of the nacelle. Complementary blocking doors, activated by the sliding of the cowling, generally allow the flow path to be closed off downstream of the cascade of vanes so as to optimize the redirection of the cold flow.

Aside from its function of reversing thrust, this sliding cowl forms part of the rear section and has a downstream end forming a jet pipe nozzle aimed at channeling the discharge of the air flows. This nozzle may supplement a primary nozzle that channels the hot flow, and is then known as a secondary nozzle.

It is known to address the problems of adapting the cross section of the nozzle to suit the various phases of flight encountered, particularly the airplane takeoff and landing phases.

In order to do so, the prior art provides (see FIGS. 1 and 2 of the attached drawing) a thrust reverser comprising, on the one hand, cascades of vanes 11 for deflecting at least part of an air flow of the turbojet engine and, on the other hand, at least one cowl 10 capable of translational movement in a substantially longitudinal direction of the nacelle and able to move alternately from a closed position in which it ensures the aerodynamic continuity of the nacelle and covers the cascades of deflection vanes 11, into an open position in which it opens up a passage in the nacelle and uncovers the deflection vanes 11.

The moving cowl 10 comprises an external part 10a and an internal part 10b each of which is mounted with the ability to move translationally and each of which is connected to a telescopic actuating cylinder 30 able to allow the longitudinal translational movement thereof (see FIG. 2). The external part 10a (on the downstream side of the cowl 10) forms a jet pipe nozzle aimed at channeling the discharge of the air flows.

By splitting the moving cowl 10 into an internal part 10b and an external part 10a which can be moved at least partially independently of one another, it is possible to adapt the relative positions of the external part 10a and of the internal part 10b to suit the flight conditions in such a way as to vary the cross section of the jet pipe nozzle formed by the moving cowl 10 by varying the length of the internal aerodynamic line of the moving cowl 10, both when the moving cowl 10 is in the closed position covering the cascades of deflection vanes 11 and when the moving cowl 10 is in the open position.

The telescopic actuating cylinder 30 has a first rod 30b for moving the internal part 10b and a second rod 30a slidably mounted in the first rod 30b, for moving the external part 10a of the cowl. The internal part 10b is attached to the first rod 30b by oblong eyelets arranged on each side of the rod 30b, so as to reduce the overhang of the attachment point and prevent any statically indeterminate stresses in the alignment of the three points of attachment of the actuating cylinder 30 to the fixed front frame and to the external 10a and internal 10b parts of the moving cowl.

This solution is satisfactory for a pneumatic or hydraulic actuating cylinder that has enough available power to compensate for the onset of parasitic friction forces between the two actuator rods 30a and 30b that are due to poor alignment.

By contrast, in the case of an electric actuating cylinder, parasitic friction forces remain detrimental because the need to increase the available power in order to overcome this friction then results in an overspecifying of the actuating cylinder control electric motor, adversely affecting the mass, size and therefore cost of the whole.

Furthermore, a double-acting electric actuating cylinder generally displays actuating difficulties. Specifically, because the second rod is able to move with respect to the base of the actuating cylinder, it is difficult to group the actuating means together into said base of the actuating cylinder and the second rod generally has to be equipped with its own motor, which will therefore also be able to move.

BRIEF SUMMARY

These problems have been solved by proposing a telescopic linear actuator for moving a first element and a second element relative to a fixed element, comprising a base intended to be attached to the fixed element and acting as a housing for a first rod prevented from rotating but able to be translationally driven by means of a drive shaft intended to be connected to rotational-drive means, the first rod being intended to be attached by one end to the first element that is to be moved, the first rod supporting a second rod arranged in the continuation thereof and intended to be attached by one end to the second element that is to be moved, said second rod being able to be prevented from rotation and translationally driven by means of a second drive shaft passing through the base and connected to rotational-drive means.

An arrangement such as this allows the means of actuating the two rods of the actuator to be grouped together in the base thereof.

The present invention aims to provide a simple and reliable actuating system that allows the two rods to be actuated by one single motor.

Further, this drive system needs to allow control of the moving parts in accordance with the aeronautical application envisioned, namely the fact that a variable nozzle section is generally commanded when the thrust reverser is locked in the closed position, the variable nozzle conversely being in a position of maximum deployment when the thrust reverser is deployed.

To achieve this, the present invention relates to a telescopic linear actuator for moving a first element and a second element relative to a fixed element, comprising a base intended to be attached to the fixed element and acting as a housing for a first rod prevented from rotating but able to be translationally driven by means of a drive shaft intended to be connected to rotational-drive means, the first rod being intended to be attached by one end to the first element that is to be moved, the first rod supporting a second rod arranged in the continuation thereof and intended to be attached by one end to the second element that is to be moved, said second rod being able to be prevented from rotating and translationally driven by means of a second drive shaft passing through the base and connected to rotational-drive means, characterized in that the means of driving the rods comprise a motor able to drive an input shaft of at least one differential, said differential having, on the one hand, a first output shaft connected to one of the first or second drive shafts and, on the other hand, a second output shaft itself connected to the second or first drive shaft.

What is meant here by a differential is any mechanical means that allows a drive speed to be distributed to a plurality of output shafts by distributing the kinematic load.

Thus, by driving the actuator rods via a differential, it is possible for one or other of the moving parts to be moved using one and the same drive means.

Advantageously, the output shafts of the differential are associated with independent means of preventing them from rotating. A configuration such as this allows control over the movements of one or the other of the moving parts that can be controlled by locking or braking the shafts.

Advantageously also, at least one of the output shafts is prevented from rotating by translationally immobilizing the corresponding rod. Specifically, the shafts can advantageously be prevented from moving by locking up the rods using locking means specific thereto. Thus, in the case of a thrust reverser, the moving cowl is associated with three latches which determine its closed or open position. These latches can then also be used to prevent the shaft from rotating, even indirectly.

Advantageously, at least one output shaft comprises at least one reduction stage.

Preferably, at least one output shaft is equipped with manual drive means.

Advantageously, the two output shafts are concentric.

Advantageously, the differential is produced in the form of an epicyclic gearset.

The present invention also relates to a thrust reverser for a turbojet engine nacelle comprising, on the one hand, means for deflecting at least part of one air flow of the turbojet engine and, on the other hand, at least one cowl able to move translationally in a direction substantially parallel to a longitudinal axis of the nacelle and able to move alternately from a closed position in which it ensures the aerodynamic continuity of the nacelle and covers the deflection means, into an open position in which it opens up a passage in the nacelle and uncovers the deflection means, the moving cowl comprising at least one nozzle-forming end part, said part being mounted such that it can move translationally with respect to the remainder of the cowl, characterized in that it also comprises an actuator according to the invention for moving the moving cowl and the nozzle.

BRIEF DESCRIPTION OF THE DRAWING

The implementation of the invention will be easier to understand with the aid of the detailed description given hereinbelow with reference to the attached drawing.

FIG. 1 (already mentioned) is a schematic partial view in longitudinal section of a thrust reverser according to the prior art, equipped with a moving cowl divided into an internal part and an external part that can be moved one relative to the other.

FIG. 2 (already mentioned) depicts a telescopic actuating cylinder for actuating the internal and external parts of the cowl, of pneumatic or hydraulic type according to the prior art, for actuating the thrust reverser that forms the variable nozzle of FIG. 1.

DETAILED DESCRIPTION

Figure 3:
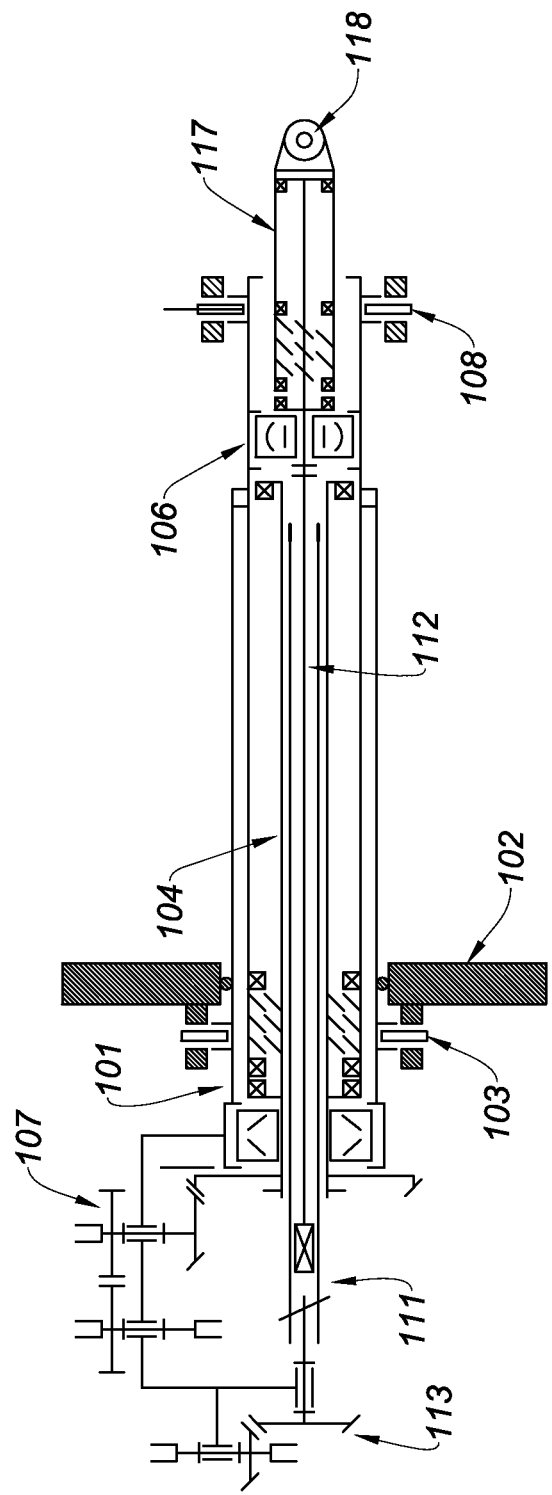
FIG. 3 schematically depicts one example of a double-acting telescopic linear actuator that can be applied to a thrust reverser of the kind illustrated in FIGS. 1 and 2 for moving the internal and external parts of the moving cowl thereof.
Figure 4:
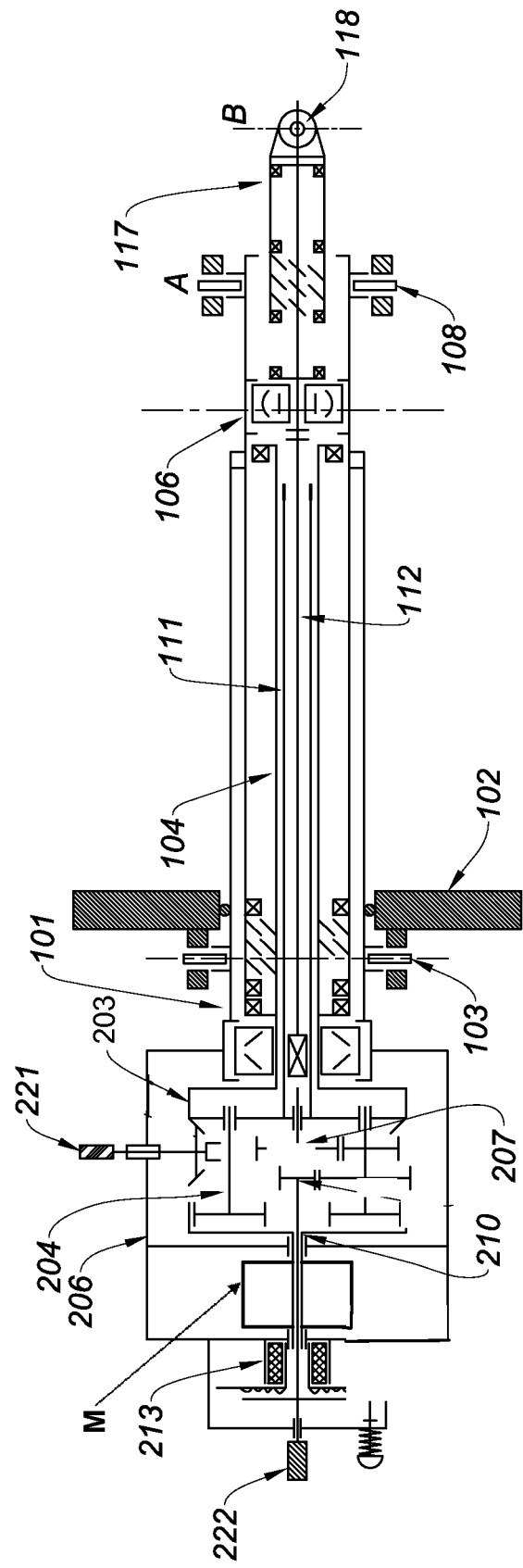
FIG. 4 is a depiction of the actuator of FIG. 3 equipped with a differential drive system according to the invention.
Figure 5:
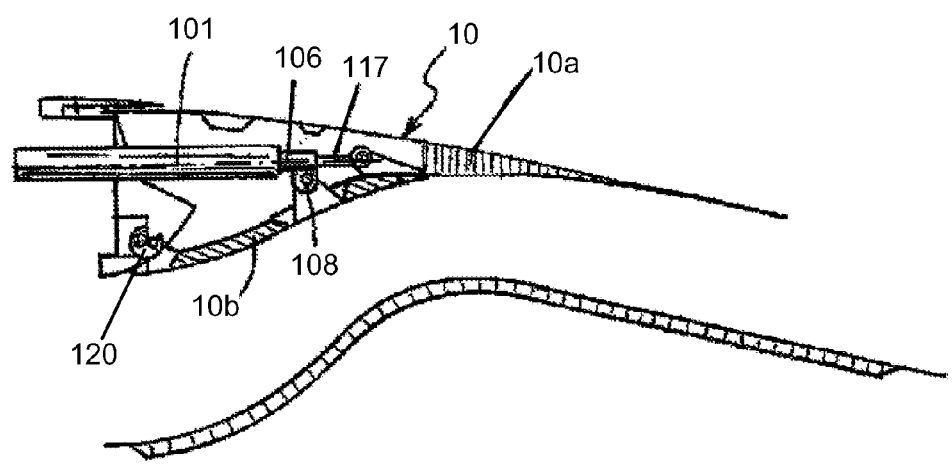
FIG. 5 depicts one example of a double-acting telescopic linear actuator that is applied to a thrust reverser of the kind illustrated in FIGS. 1 and 2 for moving the internal and external parts of the moving cowl according to the present disclosure.

The telescopic linear actuator illustrated in FIG. 3 is aimed at allowing a first element—in this instance the internal part 10b of the cowl of FIGS. 1 and 2—and a second element—in this instance the external part 10a of the cowl—to be moved relative to a fixed element, in this instance a fixed front frame 102 of the thrust reverser.

The actuator comprises a base 101 of tubular overall shape, designed to be attached to the fixed front frame 102 by a gimbal 103.

A tubular tube 106, that forms a first rod of the telescopic actuator, designed to be attached at one end, by a gimbal 108, to the internal part 10b, is mounted such that it can move in terms of axial translation but is prevented from rotating by the gimbal 108.

A drive screw 104 of the ball-screw type, is mounted able to rotate in the tube 106 that it translationally drives.

First electric motorized drive means 107 are provided for rotating the drive screw 104 so as to deploy the tube 106 out of the base 101 or retract it thereinto.

A tubular slide 111 is mounted able to rotate in the drive screw 104.

A first rod 112, connected in terms of axial translation to the sleeve 106, is mounted able to move in axial translation in the tubular slide 111.

Second electric motorized drive means 113 are provided for rotating the slide 111.

The tube 117, which constitutes a second rod of the telescopic actuator, capable of translational movement but prevented from turning, is attached by one end 118 to the external part 10a of the cowl.

According to the invention, the drive means comprise a single electric motor M able to drive a shaft 210 constituting an input shaft of an epicyclic gearset 206.

The rotational movement with which the input shaft 210 is driven is then distributed by the epicyclic gearset to, on the one hand, a first output shaft 203 connected to the first drive shaft 104 and, on the other hand, a second output shaft 207 via side gears 204, the second output shaft 207 being able to drive the sleeve 111, possibly via a reduction stage.

The epicyclic gearset 206 also incorporates manual drive means 221, 222 allowing the first output shaft 203 and the second output shaft 207 to be driven respectively, possibly by connecting up an external electric motor or a suitable tool.

In operation, when the runner A is prevented from translational movement, or when the drive shaft 104 of the runner A is directly prevented from rotating, the drive movement of the input shaft 210 by the motor M turns the epicyclic gearset 206 which causes the side gears 204 to revolve about their axes. The rotational movement of one of the side gears 204 is transmitted to the second output shaft 207 which turns the sleeve 111.

The rotation of the sleeve 111 is transmitted as before to the shaft 112 and the runner B, prevented from rotating, is driven with a corresponding translational movement.

Conversely, when the runner B is prevented from translational movement or when the second output shaft 207 is prevented from turning, for example by a brake 213 arranged in the drive train of the corresponding manual drive means 222, the movement via which the input shaft 210 is driven by the motor M turns the epicyclic gearset 206 which remains as one with the side gears 204 (these also being prevented from turning because of the fact that the second output shaft is locked), all of the side gears 204 then driving the first shaft 203, the rotational movement of which is transmitted to the first drive shaft 104 and converted as explained previously into a translational movement of the runner A.

Manual opening follows substantially the same process of operation, the output shaft that it is not desired be driven being prevented from turning.

As explained, the drive system according to the invention has the advantage of allowing one or other of the runners A, B to be made to move using a single motor and a single control, the movement being dependent solely on the opposite runner B, A being kept in a locked position.

The immobilizing of the runners A, B will be performed chiefly by latches 120 that generally, for safety reasons, form an integral part of these devices. In particular, in the context of the application to thrust reversers, a moving cowl 10 has to be associated with three locking systems. The variable nozzle system also has internal end stops that limit the translational movement of the nozzle.

It will be noted that this drive system meets numerous safety requirements and is particularly reliable.

Specifically, even in the event of a loss of movement function of the runner B, typically the nozzle flap, it is necessary for runner A, typically the thrust reverser, to lose all three latching systems for any inadvertent movement thereof to be possible. An incident such as this is extremely improbable (having a probability lower than $1 \times 10^{-9}$).

Conversely, the loss of the movement function of runner A, typically the thrust reverser, implies the return of runner B, typically the nozzle, to the locked position.

If runner B is not in the locked position when there is a desire to operate runner A, the motor M will first of all cause runner B to deploy or to return to one of its end-of-travel stops. The consequence is therefore not a loss of function but a simple delay in the maneuver, which is markedly less penalizing.

As mentioned, actuators according to the invention are particularly intended to actuate the parts of a thrust reverser cowl. Quite obviously, depending on the size of the cowl that is to be moved, it may prove necessary to use one or more actuators. Where several actuators are used, the two rods may be synchronized with the other actuators by electrically synchronizing the various motors.

It should also be noted that the embodiment described is one in which the actuator shafts are each rotated by one and the same electric motor. It is quite obviously possible, as an alternative, to provide a dedicated electric motor for each shaft.

Although the invention has been described in conjunction with a particular embodiment, it is quite obvious that it is not in any way restricted thereto and that it comprises all technical equivalents of the means described and combinations thereof where these fall within the scope of the invention.

The invention claimed is:

1. A thrust reverser for a turbojet engine nacelle comprising:
    means for deflecting at least part of one air flow of the turbojet engine;
    at least one cowl able to move translationally in a direction substantially parallel to a longitudinal axis of the nacelle and able to move alternately from a closed position in which the moving cowl provides the aerodynamic continuity of the nacelle and covers the deflection means, into an open position in which the moving cowl opens up a passage in the nacelle and uncovers the deflection means, the moving cowl comprising at least one nozzle-forming end part, said part being mounted such that said part can move translationally with respect to a remainder of the moving cowl; and
    a telescopic linear actuator for moving the remainder of the moving cowl and the nozzle-forming end part relative to a fixed element,
    wherein said telescopic linear actuator comprises a base attached to the fixed element and acting as a housing for a first rod prevented from rotating but able to be translationally driven by means of a first drive shaft connected to rotational-drive means, the first rod being attached by one end to the remainder of the moving cowl that is to be moved, the first rod supporting a second rod arranged in the continuation thereof and attached by one end to the nozzle-forming end part that is to be moved, said second rod being able to be prevented from rotating and translationally driven by means of a second drive shaft passing through the base and connected to said rotational-drive means, wherein the rotational-drive means of driving the rods comprise a motor able to drive an input shaft of at least one differential, said differential having a first output shaft connected to one of the first or second drive shafts and a second output shaft itself connected to the second or first drive shaft, wherein the second output shaft of the differential is associated with a brake and the first output shaft is associated with at least one latch such that the first and second output shafts are prevented from rotating, respectively, and wherein when the brake is engaged, the second output shaft is prevented from rotating and the motor rotates the first output shaft such that the first drive shaft translationally moves the first rod, and when the at least one latch translationally locks the first rod and the brake is disengaged, the motor rotates the second output shaft such that the second drive shaft translationally moves the second rod.

2. The actuator as claimed in claim 1, further comprising an epicyclic gearset acting as a differential.

* * * * *